T. T. PROSSER.
MACHINE FOR SWAGING THREADS ON SCREWS.
No. 97,691. Patented Dec. 7, 1869.
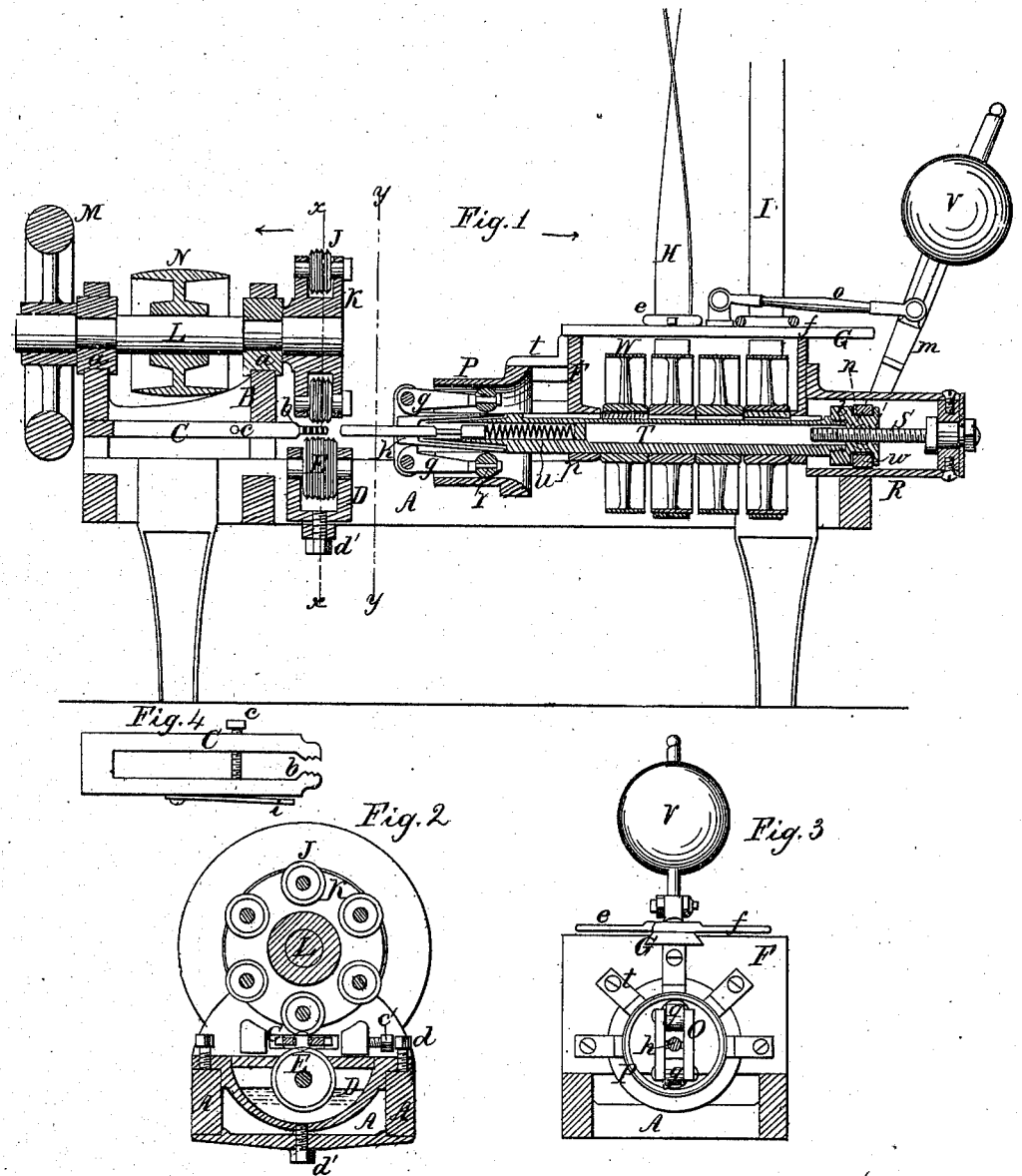

United States Patent Office.

TREAT T. PROSSER, OF CHICAGO, ILLINOIS.

Letters Patent No. 97,691, dated December 7, 1869.

---

IMPROVED MACHINE FOR SWAGING THREADS ON SCREWS.

---

The Schedule referred to in these Letters Patent and making part of the same.

---

*To all whom it may concern:*

Be it known that I, TREAT T. PROSSER, of the city of Chicago, in the county of Cook, and State of Illinois, have invented certain new and useful Improvements in a Machine for Forming the Threads on Bolts and Screws; and I do declare that the following is a full and exact description thereof, reference being had to the accompanying drawings, and to the letters of reference marked thereon.

My invention relates to machines for the manufacture of screws and bolts, and consists in the novel construction and arrangement of certain mechanical devices, by which a screw-thread is rapidly and perfectly formed on the end of a bolt or screw.

The principal of these devices are for holding and feeding the bolt or screw forward between the rollers that form the thread, for guiding and retaining the bolt or screw in position, while the thread is being formed, for operating, controlling, and reversing the motion that feeds the bolt or screw, for clasping, holding, and releasing the bolt, and for forming the threads, all as hereinafter described.

In the drawings—

Figure 1 is a longitudinal vertical section of my machine, showing its operating parts.

Figure 2 is a vertical section on the line *x–x*, of fig. 1;

Figure 3 is an end view, looking to the right on the line *y–y* of fig. 1; and

Figure 4 is a view of a part detached.

In constructing my machine, I first provide a suitable frame, A, of the size desired.

On one end of this frame I place and attach a second frame or head-stock, B, and mount therein, in suitable boxes or bearings, a shaft, L, provided, on its outer end, with a balance-wheel, M, and on its centre, between its bearings, with a pulley or driving-wheel, N, and on its inner end with a roller-head, K, as shown in fig. 1. These are all rigidly attached to the shaft L.

The head K, I provide with a series of small die-rollers, J, which I arrange in its periphery, as clearly shown in figs. 1 and 2.

They have screw-threads cut upon their peripheries, are arranged to rotate on their bearings loosely, and to be removed, when it is desired to insert others, having a thread of a different size.

In the frame A, and so as to be immediately under the roller-head K, I place a water-tank, D, so as to be adjustable vertically, by means of screws *d d'*, as shown in fig. 2, and in it mount a die-roller, E, so as to turn loosely on its bearings, and so that its axis will be in the same vertical plane with the axis of the roller-head K, as shown in the same figure.

This die-roller E has threads cut upon its periphery, corresponding with those on the rollers J, and, like them, is arranged so that it can be removed, an another substituted, when desired.

In the frame or head-stock B, I place guides C, shaped as shown in fig. 4, and so as to be parallel with the shaft L, as shown in fig. 1.

The rear ends of these guides C are connected together, and to the front end of the frame, while their front ends are open, and have threads, corresponding with the threads on the die-rollers J and E, and are constructed of the requisite length to allow their open ends *b* to come in line with the die-rollers, as clearly shown in fig. 1.

They are also provided with adjusting-screws *c* and *c'*, and an adjusting-spring, *i*, as shown in figs. 1 and 4.

The screw *c* serves to open the guides, the screw *d* to compress them, and the spring *i* to adjust them, or hold them in their proper position.

When properly adjusted, by means of these screws and spring, the plane which passes through the axis of the rollers E and K, will pass midway between the open ends of the guides.

In a line with the frame or head-stock B, and on the opposite end of the frame A, I place and suitably attach a feed-box, F, having connected to its front, or end directly opposite the open ends of the guides C, a conical tube, P, by means of stays *t*, and to its rear end a screw-case, R, and in this box, and so as to be in the same horizontal plane with the guides C, I mount a hollow shaft, T, arranged to turn freely in its boxes or bearings P, as shown in fig. 1, and having its front end constructed so as to form guides O, parallel with each other, and on opposite sides of the opening in the end of the shaft, as clearly shown in fig. 3.

To the end of the shaft, and on its sides opposite those on which the guides O are formed, I attach two dogs *h*, one on each side of the opening, as shown in figs. 1 and 3, and arranged so that their loose ends will be flush with the ends of the guides O, and between the ends of these guides O, I pivot cam-levers *g*, in the manner and shaped as clearly shown in fig. 1, the cams being on their front ends, and arranged so as to press the dogs *h* together, when desired, while on their rear ends are globe-rollers *r*, as shown in the same figure, for a purpose hereinafter explained.

On the rear end of the shaft T, I attach a nut, *l*, and through the end of the screw-case insert a feed-screw, *s*, so as to be stationary in the end of the case, being fastened by set-screws, or other suitable device, as shown in fig. 1.

This feed-screw projects or extends through the centre of the screw-case, and enters through a collar, *w*, the nut *l*, which is provided with a screw-thread, suitable for that purpose, as shown in the same figure.

By this arrangement, it will be seen that when the shaft T is rotated in one direction, it will be fed forward, and when rotated in the opposite direction, its motion will be reversed.

On each side of the case R, I make a slot, parallel with the feed-screw S, and with each other, and to the collar w connect a lever, m, (having its lower end forked, so as to straddle the case R,) by passing bolts or pins n through the forked ends of the lever, and then through the slots in the case, and so into the collar w.

The ends of the lever m are arranged to turn loosely on its pins, connecting them with the collar.

On the upper end of the lever I slide a weight, V, and connect the middle of the lever by a connecting-rod, o, to a belt-shifter, G, arranged to slide in the upper side of the feed-box F, as shown in figs. 1 and 3.

To the belt-shifter G are attached two belt slats e and f, through which the twisted belt H, and the straight belt I pass, on to pulleys W, arranged upon the shaft T, the two outer ones being keyed fast to the shaft, and the inner ones running loose.

By this arrangement, in connection with the belts, it will be seen that the belt H would rotate the shaft T in one direction, and the belt I in the opposite direction, and that only one of the belts would be connected with an operating-pulley at a time.

In the hollow shaft T, I arrange a spiral spring, u, for the purpose of throwing out the bolts or screws, as hereinafter explained.

In order that my machine may run at a very high rate of speed, it is obvious that all of its parts must be strongly and neatly made, and capable of accurate and nice adjustments.

Having accurately adjusted all its parts, I insert the blank, upon which the thread is to be formed, between the dogs h. The roller-head K is made to revolve very rapidly through the shaft L and pulley N. It is also made to revolve with a steady, uniform motion, by means of the balance-wheel M.

Motion is then given to the shaft T by the belt H, and as the shaft T is fed forward, the roller-balls r enter the conical head P, and cause the cam-levers g to press the dogs h together, and firmly clasp the blank, which is carried between the guides C and the rollers J and E, which are so arranged as to form the thread on the blank.

The adjustment of the machine is such that, when the desired length of thread has been cut, the shaft T has been carried forward so far as to carry the lower ends of the lever m beyond the line of gravity of the weight V, which then falls toward the rear end of the machine, and through the connecting-lever m and rod o carries the belt-shifter G with it, when the belt I is connected with an operating-pulley, and the belt H with a loose one, and the motion of the shaft T is reversed.

As the shaft moves backward, the globe rollers r are also carried back, and, by means of the centrifugal force, given them by their revolution with the shaft, they are carried up the inclines of the conical tube P, when the cam-heads, on the opposite ends of the levers g, release the dogs h, which, in turn, release the bolt or screw, which is immediately thrown out by the spiral spring u, against which it has been pressed, in its backward movement.

About the time this is done, the line of gravity of the weight has again been changed, so as to throw it on the other side of the point of support of the lever m, when the ball or weight falls forward, and through the lever m and connecting-rod o, and belt-shifter G, again shifts the belts H and I, when the shaft T is again fed forward.

Another blank is now inserted between the dogs, clasped by them, carried forward, and has a thread formed upon it, as in the former case, and in this way the operation is or may be carried on indefinitely.

It is obvious that by removing the spiral spring u, and making the feed-screw S hollow, as well as the shaft T, that long rods or bolts may be passed through them, and have threads formed on their ends.

It is also obvious that the water in the tank D will serve to keep the roller E cool, and that it may be renewed as often as desired. And it is further obvious that threads of different size may be cut or formed by using rollers J and E, having upon their faces the size of thread desired.

It is further obvious that the number of die-rollers J, inserted in the periphery of the roller-head K, will depend upon the size of the roller-head.

Having thus described my invention,

What I claim, is—

1. The guides C, when constructed as herein described, and arranged to be adjustable by the screws c d and spring i, and to operate substantially as and for the purpose set forth.

2. The water-tank D, with the die-roller E mounted therein, constructed and arranged substantially as herein described, and for the purpose set forth.

3. The roller head K, having the die-rollers J arranged in its periphery, in combination with the die-rollers E, for forming the thread upon the blanks, substantially as set forth.

4. In combination with the shaft T, provided with the guides O, the cam-levers g, dogs h, and conical tube P, when constructed and arranged to operate substantially as herein described, and for the purpose set forth.

5. In combination with the shaft T, and its feeding-devices, the devices for automatically shifting the belts, consisting of the lever m, provided with a weight, V, the connecting-rod o, and belt-shifter G, when constructed and arranged to operate substantially as and for the purpose set forth.

6. In combination with the shaft T and the devices for holding the bolt, the spiral spring u, for throwing the bolt out, after it is released, substantially as and for the purpose set forth.

TREAT T. PROSSER.

Witnesses:
H. WALLER,
W. S. WELLER.